May 22, 1928.

H. W. KRANZ ET AL 1,670,815

APPARATUS FOR SEPARATING SHEETS

Filed July 28, 1921

Inventor
H. W. KRANZ.
W. R. EDWARDS.
J. LUKES.

By Lloyd L. Evans

Attorney

May 22, 1928.  1,670,815
H. W. KRANZ ET AL
APPARATUS FOR SEPARATING SHEETS
Filed July 28, 1921   5 Sheets-Sheet 5

Inventor
H.W. KRANZ,
W.R. EDWARDS
J. LUKES.

By Lloyd L. Evans
Attorney

Patented May 22, 1928.

1,670,815

UNITED STATES PATENT OFFICE.

HARRY W. KRANZ, WILLIAM R. EDWARDS, AND JOHN LUKES, OF CLEVELAND, OHIO, ASSIGNORS TO THE HYDRAULIC STEEL COMPANY, OF CLEVELAND, OHIO, A CORPORATION OF OHIO.

APPARATUS FOR SEPARATING SHEETS.

Application filed July 28, 1921. Serial No. 488,179.

This invention relates to an improvement in machines for opening sheets in laminated packs, and may be used for packs of various materials where the sheets are compressed together in a compact body and adhere to each other.

It is the object of this invention to provide a method of separating such sheets which will enable the pack to be rapidly broken up and the individual sheets separated with the least possible damage thereto and to provide apparatus for effectively carrying out said method.

In the drawings forming a part of this specification:

In the manufacture of thin gauge sheets by the pack rolling process it has been found impossible to eliminate the tendency of the sheets in the pack to adhere firmly together. The extent and tenacity of such adhesion varies greatly depending largely on the composition of the steel and the regulation of the heat treatments to which the pack is subjected. Even under the best conditions obtainable a considerable proportion of the rolled packs are too firmly stuck together for expeditious manual separation. These "stickers" have previously been chopped apart with a long heavy knife which is a very laborious, tedious and expensive operation as well as being highly injurious to the sheets. The machine built using the present invention has been designed particularly for separating from each other these metallic sheets, and by its use we have been enabled to separate such "stickers" cheaply and rapidly without denting, tearing or otherwise distorting or marring the sheets.

Figure 6:
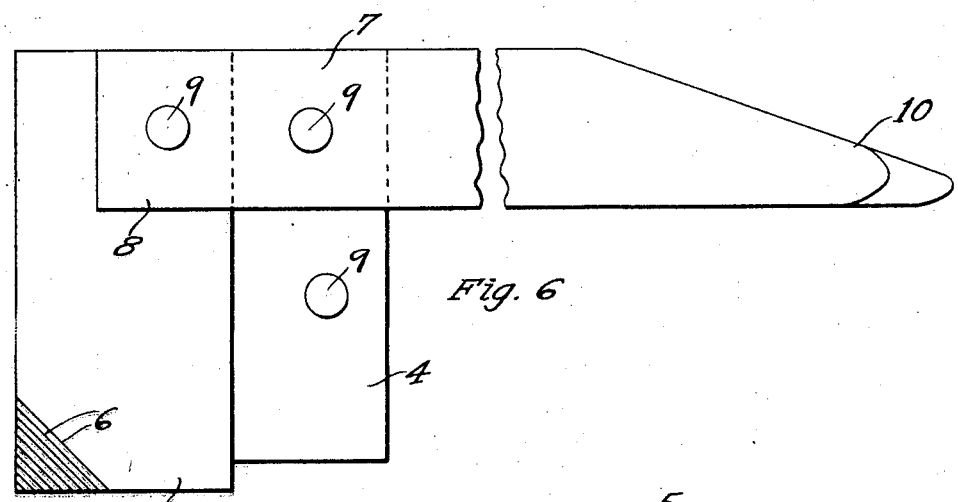
Fig. 6 is a top plan view of the entering tool.
Figure 7:
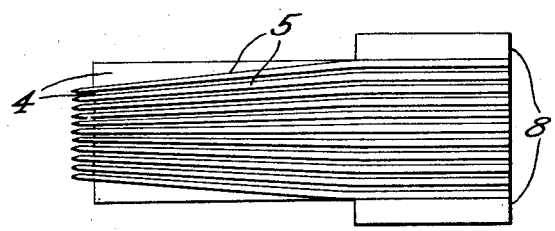
Fig. 7 is an end view of the entering tool.

In the prefered embodiment of the invention shown in the accompanying drawings the separating machine is provided with a receiving table 1 upon which the packs of sheets 2 to be separated are placed. Before being placed upon the table 1 the packs 2 have had secured at one corner thereof a positioning and guiding tool 3. The tool 3 comprises (see Figs. 6 and 7) a bar 7 which is tapered at one end to form a guiding and positioning point 10, while at the opposite end said bar is bifurcated to form spaced parallel clamps 8 between which is positioned a blade holding block 4 and a plurality of entering blades 5. These blades and the block 4 are fastened to bar 7 in any suitable manner as by rivets 9. The blades converge slightly from the bar 7 toward their outer sharpened edges as clearly shown in Fig. 7 and one corner of the sharpened edges of the blades is cut diagonally as indicated at 6 so that the tool may be easily driven into the corner of the pack of sheets to be separated. The blades will enter the pack one at a time due to the aforesaid diagonal cut and thus the insertion of the tool between successive sheets is more readily accomplished. When the tool 3 has been attached to the corner of the pack it is securely held in place by friction. A number of such tools are provided and may be driven in place on several packs so as to maintain a reserve of packs prepared for separation and not delay the operation of the machine.

Arranged at the rear end of table 1 with their bight in substantial alinement with the table 1 are upper and lower pack engaging driven rolls 11 and 12.

The table 1 is provided along one side with a guide flange 13, spaced inwardly from the flange 13 and parallel therewith is a second guide flange 14 terminating short of the rear end of table 1. The guide flange 14 is so spaced from the guide flange 13 that when a pack is placed upon the table and shoved over to bring the side edge thereof against the flange 14 the bar 7 of the entering tool 3 will strike against the flange 13 in advance of the flange 14 and be brought into parallelism with the edge of the pack. Beneath the trunnion of the roll 11 and spaced inwardly with respect to flange 13 is a guide rib 15 adapted to engage the lower portion of the inner edge of the bar 7 to guide the tool 3 as the forward end of the pack passes between the rolls 11 and 12.

The rolls 11 and 12 are driven by suitable gearing from a power shaft 16 having a pulley 17 over which runs a belt 18 extending from the drive shaft of a motor 19. The pulley 17 is connected to the drive shaft through a clutch 20 provided with an operating lever 21 connected by a link 22 to the piston of a fluid cylinder 23. Conveniently accessible connections are provided for controlling the flow of fluid to the cylinder 23 for connecting or disconnecting the clutch 20.

For obtaining a slow intermittent movement of the rolls to position the pack accurately with reference to the pack cleaving blades (hereinafter described) and for driving the rolls in case too much of a load should be imposed upon the motor the shaft 16 is provided with a pawl and ratchet drive which may be used alternatively with the motor drive above described. Fixed to the shaft 16 adjacent the inner side of the pulley 17 is a ratchet wheel 24 (see Fig. 3). Sleeved to the shaft 16 on opposite sides of the ratchet wheel 24 is a forked lever 25 carrying a spring pressed pawl 26 adapted to be forced by the spring 27 into engagement with the teeth of the ratchet wheel 24. The pawl 26 has a tail 28 engageable with the stationary trip bar 29 to disengage the pawl 26 from the teeth of the ratchet wheel 24. The lever 25 is connected at its upper end by means of a link 30 with the piston of a fluid cylinder 31. Conveniently accessible connections are provided for controlling the flow of fluid to and from the cylinder 31 to actuate the lever 25. Normally the piston of the cylinder 31 is in retracted position holding the lever 25 in a position where the tail 28 of the pawl 26 engages the trip bar 29 retaining said pawl clear of the ratchet wheel. When it is desired to use the ratchet drive the clutch 20 is disengaged and fluid is admitted behind the piston in the cylinder 31 to force the lever 25 forwardly whereupon the pawl 26 is freed from the trip bar 29 and spring 27 forces the pawl 26 into engagement with the ratchet wheel. The wheel 24 is then turned through an angle corresponding to the throw of the lever 25. The piston of the cylinder 31 is reciprocated as often as is necessary to properly position the pack or to free the same sufficiently to permit normal operation in case of excessive resistance to the passage of the pack through the machine.

At the rear of the feed rolls 11 and 12 is a transverse guideway 32 in which travels the cleaving blade frame 33. The frame 33 is fixed to the end of the piston 34 of a fluid cylinder 35. Conveniently accessible connections are provided for controlling the flow of fluid to and from the cylinder 35. The frame 33 is movable from a position at one side of the feed bed to a position in which it extends across said bed behind the feed rolls 11 and 12, an adjustable limit stop 36 is mounted in the guideway 32 to stop the frame 33 in proper position behind the feed rolls 11 and 12.

Figure 2:
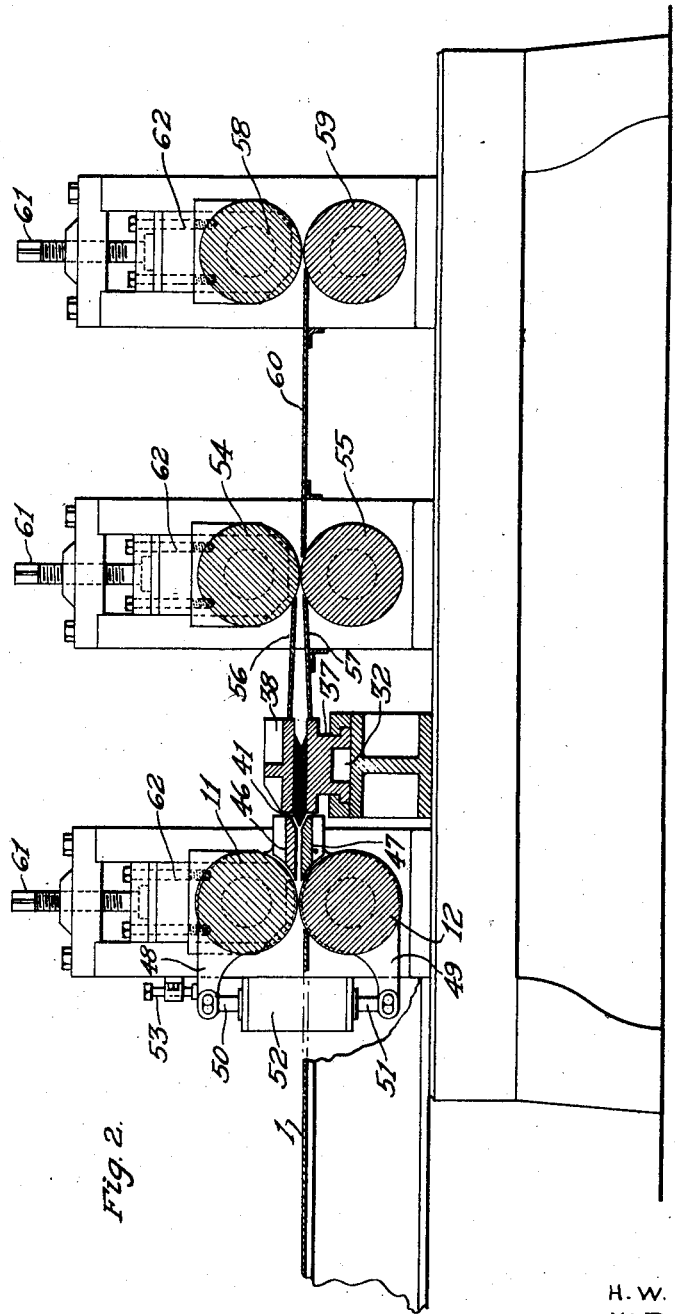
Fig. 2 is a sectional view taken on a longitudinal vertical plane through the machine.
Figure 5:
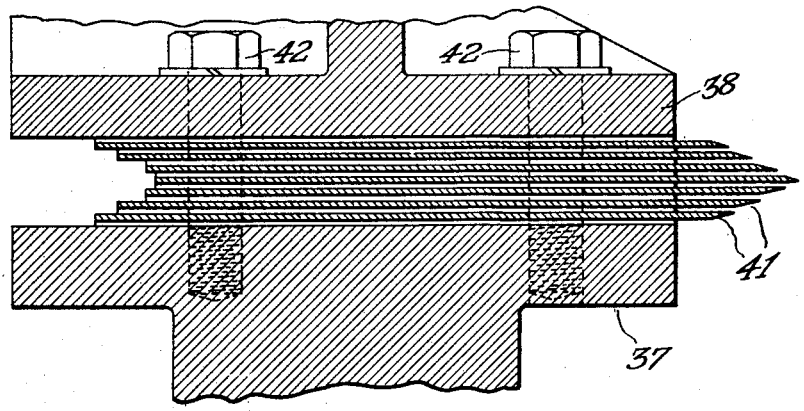
Fig. 5 is a detail showing a transverse section through the cleaving blades.

The cleaving blade frame comprises a lower guide engaging and pack confining bar 37 and an upper pack confining bar 38. Between the bars 37 and 38 at their ends are blade holding spacing blocks 39 and 40. Extending between the blocks 39 and 40 are a series of superposed horizontally disposed cleaving blades 41. As shown in Figs. 2 and 5 the edges of these blades project forwardly beyond the forward edges of the bars 37 and 38, the center blade projecting the farthest the others extending progressively shorter distances toward the top and bottom. This arrangement of the blades permits insertion thereof along the forward edge of the pack with a minimum spreading or expansion of the forward edge of the pack whereby the top and bottom sheets readily enter between the lower and upper bars 37 and 38 and the bottom and top blades. The bars 37 and 38 are secured together by means of connecting bolts 42. The block 40 is adjustable by means of screws 43 to tension the blades and the blades at this end of the frame are provided with slightly enlarged holes to receive the bolts 42.

The block 39 at the forward end of the frame 33 is provided with a ledge 44 to receive the bar 7 of the entering tool 3 to aline the blades of the tool with the cleaving blades 41, and a lug 45 to engage the inner side of the bar 7 to retain the tool 3 in position on the frame 33.

Immediately in advance of the frame 33 are upper and lower pack confining and positioning bars 46 and 47. These bars have beveled rear edges closely overlying the projecting edges of the cleaving blades 41 and beveled front edges closely adjacent and corresponding to the curvature of the surface of the rolls 11 and 12. The bars 46 and 47 are carried by arms 48 and 49 sleeved upon the trunnions of the upper and lower rolls 11 and 12 respectively and projecting forwardly of said rolls. Attached to the forward ends of said arms 48 and 49 are pistons 50 and 51 extending from opposite ends of fluid pressure cylinders 52 and adapted to be simultaneously operated in opposite directions. Conveniently accessible connections for controlling the flow of fluid to and from the cylinders 52 are provided. Adjustable stops 53 engageable with the arms 48 limit the closing movement of the confining bars 46 and 47.

In the rear of the frame 33 is a second set of upper and lower driven rolls 54 and 55 which are of slightly greater diameter than the rolls 11 and 12 in order to maintain the pack under tension and prevent any buckling of the sheets. Between the confining plates 37 and 38 and the bight of the rolls 54 and 55 are upper and lower rearwardly converging guides 56 and 57. At the rear of the rolls 54 and 55 a set of upper and lower pack engaging delivery rolls 58 and 59 and extending between the rolls 54 and 55 and 58 and 59 on a level with the bight thereof is a bridging bed plate 60.

Figure 1:
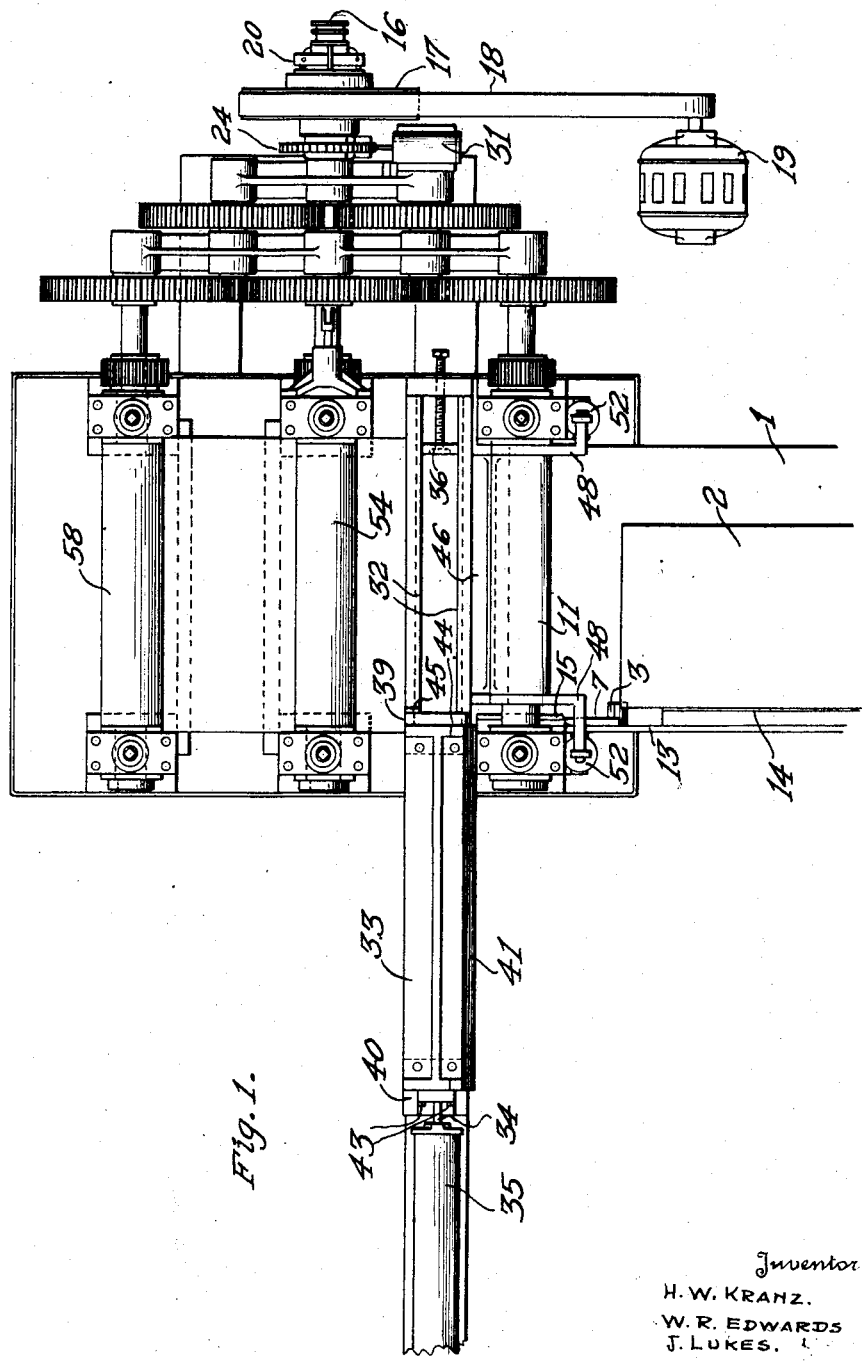
Figure 1 is a top plan view of the separating machine.
Figure 3:
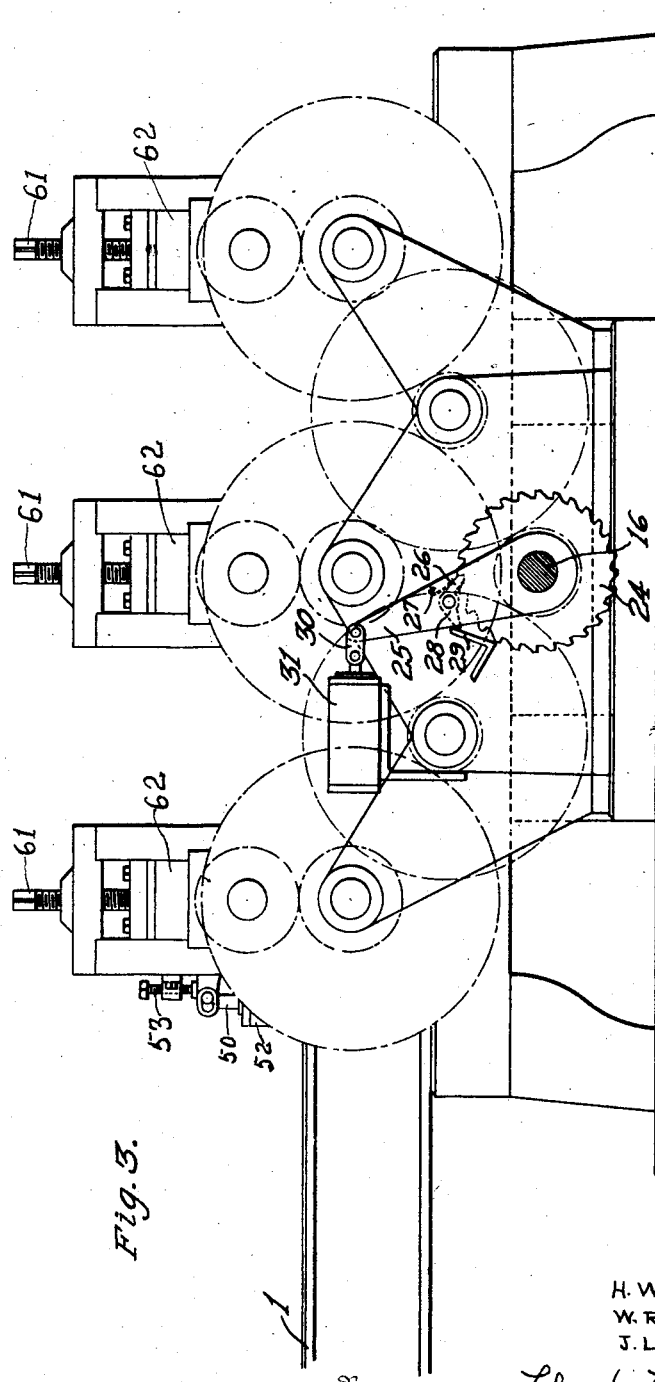
Fig. 3 is a partly diagrammatic side view of the machine showing the driving gears for the feed rolls in dotted lines and the ratchet drive therefor in full lines.
Figure 4:
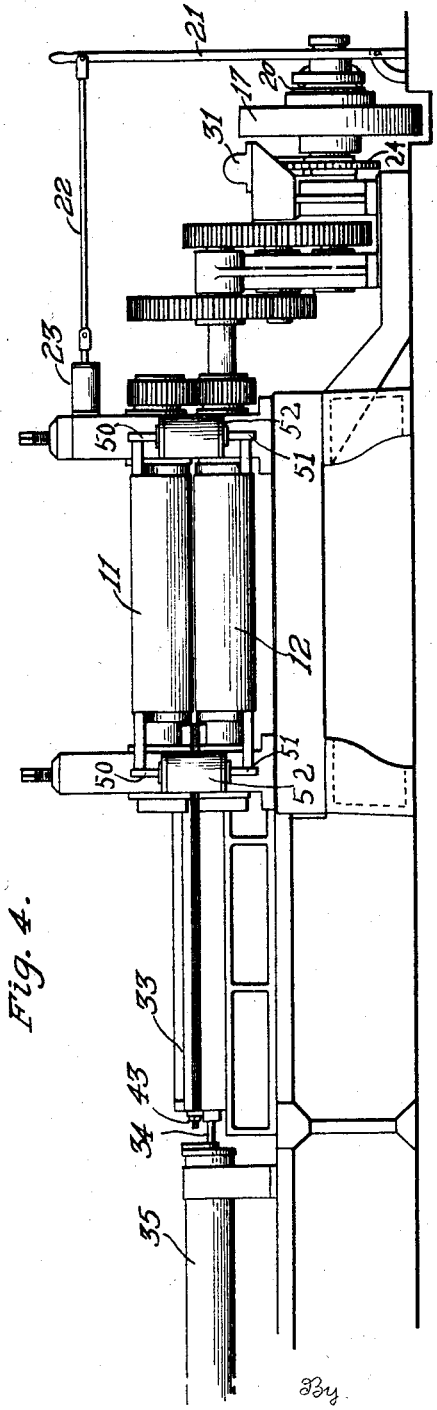
Fig. 4 is an end elevation of the machine looking from the forward or feed in end with the feed table omitted.

The rolls 11 and 12, 54 and 55, and 58 and 59 are all driven at the same angular speed by suitable gearing from the drive shaft 16 as clearly shown in Figs. 1, 3 and 4.

The upper rolls 11, 54 and 58 are each mounted for vertical adjustment to accommodate packs of different sizes by means of adjusting screws 61 and are each provided with yieldable buffer blocks 62, preferably of rubber.

In operation a pack 2 with the entering tool 3 secured in the corner thereof is placed upon the feed table 1 in the position shown in Fig. 1 with its edge positioned against the guide flange 14 and the bar 7 of the tool 3 positioned against the guide flange 13. The feed rolls are then started and the pack 3 is shoved forward bringing the bar 7 of the tool 3 behind the guide rib 15 beneath the trunnion of the roll 11 and the forward edge of the pack into the bight of the rolls 11 and 12. The pack is then carried forward by the rolls 11 and 12 until the bar 7 rests on the ledge 44 of the frame 33 and the blades of the tool 3 are nearly in alinement with the cleaving blades 41. The clutch 20 is then thrown out and the ratchet 24 operated from the piston 31 as described above until the blades 5 of the tool 3 are in substantial alinement with the cleaving blades 41. The rolls are then stopped and fluid admitted to the cylinders 52 to bring confining bars 46 and 47 into engagement with the upper and lower sides of the pack. Fluid is then admitted to the cylinder 35 and the frame 33 moves along the guideway 32 pushing the entering tool along the edge of the pack the forward edge of each cleaving blade 41 entering between the sheets of the pack behind its alined blade on the entering tool 3. When the end block 39 of the frame 33 strikes the stop 36 the tool 3 and the block 39 will be clear of the opposite edge of the pack and each of the cleaving blades will have its edge inserted between sheets in the pack throughout the forward edge of the pack. The feed rolls are now again started by throwing in the clutch 20 and the forward edge of the pack forced forward between the confining plates 37 and 38 of the frame 33, the upper and lower sheets of the pack being guided between the plates 37 and 38 and the lower and upper cleaving blades by the beveled inner faces of the confining bars 46 and 47. The confining bars 46 and 47 engage practically the entire upper and lower surface of the pack between the rolls 11 and 12 where the feeding pressure is applied and the cleaving blades 41 so that no buckling of the sheets or bending of the pack can occur due to the resistance to the passage of the knives along the divisional planes between adjacent sheets in the pack. Each sheet being held flat as it passes over its cleaving blade there is no denting, distorting or tearing of the sheets. Even in extreme cases in which the sheets are actually welded together in spots the cleaving blades cut cleanly through the weld and the only flaw in the sheets will be limited to such welded spots. As the pack is forced through the cleaving blades the rear ends of the separated sheets are guided by the guide plates 56 and 57 into the bight of the rolls 54 and 55 which, due to their increased diameter and slightly greater peripheral speed exert a strong pull on the pack relieving the rolls 11 and 12 of a large part of this load holding the separated portions of the steel taut so that there is no danger of the sheets buckling in the guides at the rear of the blades. When the pack has passed completely through the cleaving blades the control valves for the cylinder 35 are operated to retract the piston 34 bringing the frame 33 back to its position at the side of the table as shown in Fig. 1. The tool 3 which was attached to the separate pack and remained on the ledge 44 during the separating operation is now removed and returned for attachment to another pack and the machine is ready to receive another pack to be separated.

In case the operator desires to position the pack more accurately, or in case the resistance to the passage of the pack through the cleaving blades becomes so great that the belt 18 is caused to slip the operator can operate the ratchet lever 25 to rotate the drive shaft until the excessive resistance is overcome and continuous rotation by the belt reestablished.

By using a reversible motor for driving the machine, it is possible to reverse the feed rolls and thus back the pack out of the machine whenever desirable. The reversibility of the machine is very convenient in the event that there should be any accident causing distortion or buckling of the sheets, or simply in case the operator desires to remove the pack for any purpose such as alining, restarting, etc.

It is understood that changes, modifications and substitutions may be made without departing from the spirit and scope of our invention as set forth in the appended claims.

What we claim is.

1. In a sheet separating machine, a support for a pack of adhering sheets, a cleaving blade, means for moving said blade transversely across said support to enter said blade between two of the sheets of the pack, and means for moving said pack longitudinally of said support to cause said blade to traverse the pack.

2. In a sheet separating machine, a support for a pack of adhering sheets, a series of superposed cleaving blades, means for moving said blades transversely across said support to enter said blades between the sheets of the pack, and means for moving said pack longitudinally of the support to cause said blades to traverse said pack.

3. In a sheet separating machine, a support for a pack of adhering sheets, a cleaving blade, means for entering said cleaving blade between superposed sheets in the pack, means effecting the traverse of said blade through the pack and a confining bar for extending across the top of the pack adjacent to and in advance of said blade.

4. In a sheet separating machine, a feed table for packs of adhering sheets, a cleaving blade, means for entering said cleaving blade between superposed sheets in the pack, superposed feed rolls in advance of said blade for feeding the pack toward said blade.

5. In a sheet separating machine, a feed table for packs of adhering sheets, a cleaving blade, means for entering said cleaving blade between superposed sheets in the pack, superposed pack engaging rolls in advance of said blade and superposed pack engaging rolls in the rear of said blade.

6. In a sheet separating machine, a feed table for packs of adhering sheets, a cleaving blade, means for entering said blade between superposed sheets in the pack, superposed pack engaging rolls in advance of said blade and superposed pack engaging rolls in the rear of said blade said rear rolls being of greater diameter than the front rolls.

7. In a sheet separating machine, a feed table for packs of adhering sheets, a set of superposed closely spaced cleaving blades, mounted for endwise movement from one side of the table across the same, means for positioning said pack with its forward edge in alinement with said blades, means for moving said blades to enter them between successive sheets in the pack and means for feeding said pack through said set of blades.

8. In a sheet separating machine, a feed table for packs of adhering sheets, a cleaving blade mounted for endwise movement from one side of the table across the same, superposed pack engaging feed rolls in advance of said blade a clutch controlled continuous drive for said feed rolls and a manually controlled ratchet drive for said feed rolls.

9. In a sheet separating machine, a feed table for packs of adhering sheets, a frame carrying a superposed set of cleaving blades mounted for endwise movement transversely across said table, an entering tool comprising a set of blades adapted to be inserted between sheets at the corner of a pack and a forwardly extending positioning and engaging member, tool engaging means on the forward end of said frame, means for feeding said pack toward said frame and for positioning said pack with said tool engaging said frame and the blades of the tool alined with the blades of the frame to enter said cleaving blades between the sheets of the pack.

10. A sheet separating machine comprising, a supporting bed, a cleaving blade movable transversely across said bed, a guide blade adapted to be inserted between superposed sheets in the pack, interengaging means carried by said blades adapted to aline said blades whereby said transversely movable blade is guided into the pack between said superposed sheets.

11. A sheet separating machine comprising, a feed table for packs of adhering sheets, a set of closely spaced superposed cleaving blades, means for entering said blades between the sheets of the pack, means for rigidly supporting said blades in position transversely across the feed table, means for feeding said packs, and pack confining members rigidly supported above and below said blades.

12. In a sheet separating machine a separating frame comprising end blocks, closely spaced, superposed blades extending between said blocks and upper and lower plates secured to said blocks and closely overlying and underlying said blades.

13. The structure set forth in claim 12, the forward edges of said blades extending beyond the forward edges of said plates and blocks.

14. The structure set forth in claim 12, the forward edges of said blades extending to different distances beyond the forward edges of said plates and blocks.

15. The structure set forth in claim 12, one of said blocks being adjustable whereby said blades may be placed under tension.

16. In a sheet separating machine, a feed table for packs of adhering sheets, a set of cleaving blades, means for rigidly supporting said blades in position transversely across said feed table, a pair of superposed pack engaging feed rolls in advance of said blades, a second pair of superposed pack engaging rolls in the rear of said blades and a third set of superposed pack engaging rolls in the rear of said second set of rolls.

17. In a sheet separating machine, a feed table for packs of adhering sheets, a set of cleaving blades, means for rigidly supporting said blades in position transversely across said feed table, a pair of superposed pack engaging feed rolls in advance of said blades, a second pair of superposed pack engaging feed rolls in the rear of said blades, pack confining members above and below said blades and converging guide members extending from said confining members to the bight of said pair of rolls.

18. In a sheet separating machine, a support for a pack of adhering sheets, a cleaving blade, means for entering said cleaving blade between superposed sheets in the pack, means for effecting the traverse of said blade through the pack, confining bars extending across the top and bottom of the pack adjacent to and in advance of said blade and means for adjusting one of said bars.

19. In a sheet separating machine, a feed table for packs of adhering sheets, means for gripping said packs and positively advancing it along said feed table, a set of superposed knives extending transversely across said feed table confining members adapted to engage top and bottom of the pack adjacent to and in advance of said blades, and confining members adapted to engage the top and bottom of the pack above and below said blades.

20. In a sheet separating machine, a feed table for packs of adhering sheets, means for gripping said pack and positively advancing it along said table, means for separating superposed packs at one edge thereof, a cleaving blade movable from a position at one side of the table across the same, and means for moving said cleaving blade across said table between said superposed sheets.

21. In a sheet separating machine, a supporting bed for packs of adhering sheets, a set of superposed cleaving blades movable across said bed in planes intermediate the top and bottom of the pack and means on said bed for holding said pack against lateral movement.

22. In a sheet separating machine, a supporting bed for packs of adhering sheets, a set of superposed cleaving blades movable across said bed in planes intermediate the top and bottom of the pack, means for holding said pack against lateral movement, and means for confining the top and bottom of said pack.

23. In a sheet separating machine, a feed table for packs of adhering sheets, a cleaving blade, means for rigidly holding said blade in position transversely across said table in a plane intermediate the top and bottom of the pack, upper and lower pack engaging feed rolls in advance of said blade, and upper and lower pack engaging feed rolls in the rear of said blade, said upper pack engaging rolls being adjustably and yieldably mounted.

24. In a sheet separating machine, a feed table for packs of adhering sheets, a cleaving blade, means for rigidly holding said blade in position transversely across said table in a plane intermediate the top and bottom of the pack, upper and lower pack engaging feed rolls in advance of said blade, a confining member engageable with the upper surface of the pack adjacent said blade, crank arms supporting said confining member and sleeved to the trunnions of said upper roll and means connected to said arms for adjusting said confining member.

25. In a sheet separating machine, a feed table for packs of adhering sheets, a cleaving blade, means for rigidly holding said blade in position transversely across said table in a plane intermediate the top and bottom of the pack, upper and lower pack confining members adjacent to and in advance of said blade and means for adjustably and yieldably holding said confining members in position.

26. An entering tool for sheet separating machines comprising, a blade supporting block, a set of superposed knives secured to one face of said block and a positioning shank secured to said block and extending at right angles to said face.

27. The structure set forth in claim 26, said blades converging from said block to their entering edges.

28. The structure set forth in claim 26, said blades having their inner corners cut on parallel diagonal lines to form a beveled entering edge.

29. The structure set forth in claim 26, said blades having their inner corners cut on parallel diagonal lines of progressively increasing length.

30. In a sheet separating machine, upper and lower pack engaging feed rolls, upper and lower pack engaging confining bars at the rear of said rolls mounted for pivotal movement about the axes of the rolls, means for holding said bars in adjusted position and a series of superposed cleaving blades positioned in alinement with the space between said confining bars and closely adjacent thereto.

31. In a sheet separating machine, upper and lower pack engaging feed rolls, upper and lower pack engaging confining bars at the rear of said rolls mounted for pivotal movement about the axes of the rolls, the forward outer edges of said bars being beveled to a curvature corresponding to the curvature of the rolls and lying closely adjacent thereto, means for moving said bars toward and from each other and for holding them in adjusted position, and a series of superposed cleaving blades positioned in alinement with the space between said confining bars and closely adjacent thereto.

32. In a sheet separating machine, a feed table for packs of adhering sheets, means for positively advancing said packs along said table, upper and lower pack engaging confining bars extending transversely of the table, the rear inner edges of said bars being beveled, and a series of superposed cleaving blades in alinement with said bars, the forward edges of said blades projecting into the space between the said beveled edges of said confining bars.

33. The structure set forth in claim 32, said blades projecting forwardly progressively farther from the top and bottom to the center.

34. In a sheet separating machine upper and lower pack engaging feed rolls, upper and lower pack engaging confining bars at the rear of said rolls mounted for pivotal movement about the axes of the feed rolls, the forward outer edges of said bars being beveled to a curvature corresponding to the curvature of the rolls and lying closely adjacent thereto, the rearward inner edges of said bars being beveled, means for moving said bars toward and from each other and for holding them in adjusted position, and a series of superposed cleaving blades positioned in alinement with said confining bars and having their forward edges projecting into the space between beveled rear edges of said bars, said blades projecting into said space progressively farther from the top and bottom to the center to correspond with the beveled edges of the confining bars.

35. In a sheet separating machine, sheet separating mechanism, a drive shaft, driving connections from said shaft to said mechanism, frictional driving means for said shaft, a ratchet wheel fixed to said shaft, a movable member carrying a pawl engageable with said ratchet wheel and means for actuating said movable member to rotate said shaft.

In testimony whereof, we hereunto affix our signatures.

HARRY W. KRANZ.
WILLIAM R. EDWARDS.
JOHN LUKES.